United States Patent Office 2,735,645
Patented Feb. 21, 1956

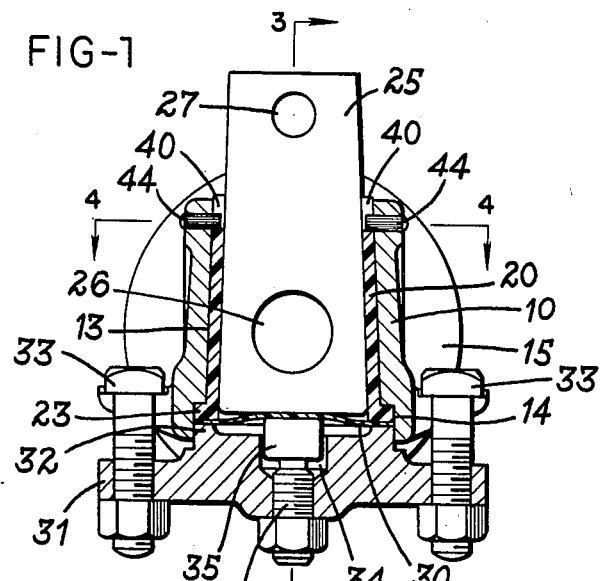

2,735,645

PLUG VALVE WITH PLUG RETAINING LINER KEY

Jacob B. Freed, Dayton, Ohio, assignor to The Duriron Company, Inc., Dayton, Ohio, a corporation of New York Application April 7, 1955, Serial No. 499,958

7 Claims. (Cl. 251—192)

This invention relates to plug valves, particularly to valves adapted to control the flow of corrosive fluids and the like.

The invention has special relation to valves for such purposes embodying a molded plastic liner which is highly resistant to corrosion, and which has good self-lubricating properties. In addition to their corrosion resistant properties such valves must be capable of withstanding relatively high pressures, and it is accordingly a primary object of this invention to provide a corrosion resistant plug valve which is capable of operating in the absence of lubricant and which will withstand relatively high pressures.

The molded plastic lining for valves of the above type is provided with suitable apertures adapted to be aligned with the inlet and outlet flow passages of the valve body, and the rotatable plug of the valve is provided with a port which may be aligned with these apertures, and consequently with the inlet and outlet passages, to control the flow through the valve. The liner should be fixed relative either to the plug or the valve body in order to assure the proper alignment of the liner apertures with the inlet and outlet passages and the plug port, and it is a further object of this invention to provide an improved and effective locking arrangement for the liner whereby it is positively held against rotation relative to the valve body in order to prevent misalignment of the liner apertures with respect to the inlet and outlet passages.

The lined valves of the type to which the present invention relates are sometimes subjected to relatively high internal pressures, for example in excess of 100 pounds per square inch, as well as high temperatures and wide temperature variations of the order of several hundred degrees. It is important that the seal between the liner and both the plug and the valve body be maintained continuous in the areas surrounding the plug port and the flow passages in the body throughout the full range of temperatures and pressures effective thereon in use. The situation is complicated by the fact that large temperature changes cause alternate expansion and contraction of the liner and accompanying movement thereof toward its smaller end, and this alternate stressing and relieving of the liner may reach a point such that line pressure can act upon the bottom of the plug. In this event, since the larger diameter of a tapering plug is usually less than the smaller diameter of the bore in the body of the lined valve, the plug may even be forced through the smaller end of the liner and completely out of the valve body.

It is an object of the present invention to provide a lined valve construction such that axial movement of the plug toward the smaller end of the bore in the valve body is positively limited to a small range minimizing axial misalignment of the plug port with the flow passages in the valve body.

A further object of the invention is to provide a lined valve of such construction that the alignment of the liner with respect to the flow passages therein and in the valve body may be visually checked from outside the valve without removing or releasing any parts of the valve.

It is also an object of the invention to provide a lined valve generally of the characteristics outlined above wherein the parts which lock and align the liner also serve to limit the axial movement of the plug in the direction of its smaller end.

Other objects and advantages of the invention will be apparent from the following description, the accompanying drawings and the appended claims.

In the drawing—

Fig. 1 is a sectional view through a valve constructed in accordance with the present invention;

Fig 2 is an enlarged fragmentary section of the liner locking device seen in Fig. 1;

Fig. 3 is a vertical section on the line 3—3 of Fig. 1 with the upper portion of the liner in elevation; and Fig. 4 is a horizontal section on the line 4—4 of Fig. 1.

Referring to the drawing, while illustrates a preferred embodiment of the invention, the valve body 10 is shown as of the two-way type incorporating flow passages 11 and 12 at opposite sides of a tapered bore 13 having a counterbored recess 14 at its large end. Suitable flanges 15 are provided at the outer ends of these flow passages for attachment to adjoining pipe members in any well known manner. Within bore 13 is a liner sleeve 20 of molded plastic material, and this liner is tapered complementarily to the tapered surface of bore 13 and is of such length relative the bore as to extend substantially entirely therethrough. Inlet and outlet apertures 21 and 22 are provided in the sleeve at appropriate locations so as to be aligned with the flow passages 11 and 12, and an annular shoulder 23 extends radially outwardly of the larger end of sleeve 20 and is receivable within recess 14 so as to index the apertures 21 and 22 with respect to passages 11 and 12.

A preferred material for line 20 is a polyethylene resin material, particularly the halogen substitution products thereof and including polyethylene itself, and $C_2Cl_4$, $C_2ClF_3$ and $C_2F_4$. The latter product, namely polytetrafluoroethylene and its interpolymers and copolymers is commercially available under the name of Teflon, and has been found especially desirable for use in accordance with the present invention, having the combination of the desired characteristics, namely, complete inertness in the presence of corrosive fluids including solvents, good self-lubricating properties, low frictional drag in contact with the corrosion resistant metals, toughness and resistance to physical wear, abrasion and the like, usable over a wide temperature range, and ability to be worked and capable of cold flow under pressure in order to establish highly effective sealing conditions. Such Teflon material has the property of cold flow, beginning in the range of pressures of about 1200 to 1500 pounds per square inch, having an attained deformation of from 4 to 8 percent at a pressure of 1200 pounds per square inch, such percentage increasing up to substantially continuous flow at pressures above about 1500 pounds per square inch.

The valve plug 25 which is adapted to be seated within liner 20 has a continuously tapered outer surface complementary to the taper of the liner and a transverse port 26 adapted to be aligned with passages 11 and 12 to control the flow of fluid through the valve. Plug 25 is preferably somewhat greater in length than liner 20, and the smaller end of the plug therefore projects outwardly of the liner and valve body. A small opening or bore 27 in this outwardly projecting small end of the plug receives an operating pin or the like for rotating the plug within the body and controlling the position of port 26 with respect to passages 11 and 12.

A thrust diaphragm and sealing member 30 is received within recess 14 and overlies the shoulder 23 and the entire larger end of plug 25. A cap 31 is provided with an annular boss 32 receivable within recess 14 and pressing against the peripheral portions of diaphragm 30, to urge the diaphragm and liner shoulder 23 against the bottom of the recess and thereby to clamp the larger end of liner against both axial and angular movement. Suitable bolts 33 connect cap 31 with valve body 10 for applying pressure through boss 32 to liner shoulder 23. Within cap 31 is a central recess 34, and within this recess is a thrust member 35 adapted to engage the central portions of diaphragm 30 and through the diaphragm to apply axial force to plug 25. A central bolt 36 is threaded through cap 31 in abutting relation with the under side of thrust member 35 for exerting the axial force upon the valve plug.

Thus when the valve is assembled and suitable pressure is applied to cap 31 and thrust member 35, the large end of liner 20 is clamped in properly indexed position within bore 13, and the plug 25 is pressed against the liner with resultant cold flow thereof to complete the sealing engagement of liner 20 with the tapered bore 13 and plug 25. The plug is thereby effectively sealed with respect to the valve body, both circumferentially and axially on both sides of port 26, against leakage of high pressure fluid.

In order to lock the smaller end of liner 20 positively against rotation during turning movements of plug 25, as well as to limit its axial movement, a plurality of grooves or notches 40 are formed at the smaller end of liner 20 to receive projections on the smaller end of bore 13. These projections may be formed integrally with valve body 10 or separately threfrom, and they are represented in the drawings by a plurality of pins 44 projecting radially through transverse bores 45 in the valve body into the interior of the bore 13 for engagement within the grooves 40. Since these grooves 40 are visible from the top of the valve, they provide a visual check on the position of sleeve 20 with respect to the valve body, and both the notches 40 and pins 44 are accordingly located in predetermined accurate angular relation with the apertures 21—22 and the flow passages 11 and 12 respectively, preferably at 90° thereto.

In addition to this locking action of the pins, their radially inner ends provide stops or abutments against which the plug 25 will engage in the event of too great axial movement towards the smaller end of bore 13. Thus, if there should be leakage of the high pressure fluid into the space between the bottom or wider end of plug 25 and the diaphragm 30, the resultant high pressure beneath the plug will merely force the plug against pins 40 rather than blow the plug completely out of the valve body. The degree of taper preferred for use in these plug valves is so small that the larger diameter of plug 25 is less than the small diameter of tapered bore 16, and except for the presence of pins 40, the exertion of high pressure beneath the larger end of the plug, together with alternate expansion and contraction of the liner sleeve due to fluctuation in temperature and/or pressure of the fluid passing through the valve, could eventually force the plug completely out of the valve with consequent failure thereof. At the same time, space should be provided for axial adjustment of the plug, and satisfactory results have been obtained, for example with a one-inch valve having a plug tapered 2° on a side wherein pins 44 which are ¼ inch in thickness are located in transverse bore 45 centered approximately ¼ inch from the outer end of bore 13 with these pins of such dimensions radially of bore 13 as to provide an initial clearance of 1/32 inch between their inner ends and the adjacent portion of the plug and thus to overhang the larger end of the plug. In this example the distance from the center of each bore 45 to the inner end of counterbore 14 was 2.25 inches, and an initial clearance of approximately 3/16 inch was provided between the pins 44 and the bottoms of the grooves 40.

The pins 44 may be secured in any suitable manner within openings 45, for instance, by a press or driving fit. However, actual tests of the above described valve have indicated that preferred results are obtained by rigidly securing the pins in openings 45, as by threading or welding, the latter being a simple and effective arrangement as indicated at 46. Tests with the temperature of the fluid at 300° F., in the three cases where no pins were used and where the pins were respectively driven into place and welded in place, indicated that the forces required to push the plug entirely out of the valve body were approximately as follows:

| Valve Size | Force in lbs., No pins | Force in lbs., Driven pins | Force in lbs., Welded pins |
| --- | --- | --- | --- |
| ½ in | 165 | 500 | 3,100 |
| ¾ in | 280 | 1,130 | 6,600 |
| 1 inch | 415 | 940 | 3,400 |

Assuming that a maximum line pressure of about 150 pounds per square inch could normally act upon the bottom of the plug, the safety factor for these three valves was increased to about 3, 4 and 2.25 respectively with the use of driven pins only, and by using the welded pin construction the safety factor was increased to about 19, 23.7 and 8.2 respectively for the above identified valves. The same dimensions noted above for a one-inch valve applied also to the smaller valves used in these tests except that for the three-quarter inch valve, the distance from the counterbore 14 to the center of bores 45 was 1 15/16 inches, while for the half-inch valve, pins 3/16 inch in diameter were used in bores 45 centered approximately 3/16 inch from the small end of bore 13 and 1½ inches from counterbore 14.

It will thus be seen that the present invention provides a lined plug valve wherein the positioning of the liner within the valve is accurately fixed and may be visually checked without in any way dismantling the valve. This invention also provides an interference point or projection which acts as a stop to prevent the tapered plug from being forced out of the smaller end of the tapered liner sleeve, and thereby greatly increases the safety factor of these valves.

While the forms of apparatus herein described constitutes preferred embodiments of the invention, it is to be understood that the invention is not limited to these precise forms of apparatus, and that changes may be made therein without departing from the scope of the invention which is defined in the appended claims.

What is claimed is:

1. A lined plug valve comprising a valve body having flow passages therethrough and a tapered bore therein extending transversely of said flow passages, a tapered sleeve liner of deformable material fitted within said bore and having apertures therein for alignment with said flow passages, a tapered plug received within said liner and having a port therethrough for connecting said flow passages, means for pressing said plug into said liner to deform said liner into continuous circumferential sealing engagement with said bore and said plug on all sides of said flow passages, means for rotating said plug to move said port into and out of alignment with said flow passages, at least one groove in the smaller end of said liner located in predetermined angular relation with said apertures, a projection extending inwardly from the wall of said bore adjacent the smaller end thereof for engagement within each said groove upon insertion of said liner in said bore to resist movement of said liner axially of said bore toward the smaller end thereof under the deforming pressure of said pressing means, said projection being located in predetermined angular relation with said flow passages to lock said liner with said apertures aligned with said flow passages throughout the rotational movement of said plug, and the radial distance from the inner end of said projection to the axis of said bore being less than the radius of the larger end of said plug to provide for positive engagement of said projection with said plug in response to axial movement of said plug and thereby to limit axial movement of said plug toward the smaller end of said bore.

2. A lined plug valve comprising a valve body having flow passages therethrough and a tapered bore therein extending transversely of said flow passages, a tapered sleeve liner of deformable material fitted within said bore and having apertures therein for alignment with said flow passages, a tapered plug received within said liner and having a port therethrough for connecting said flow passages, means for pressing said plug into said liner to deform said liner into continuous circumferential sealing engagement with said bore and said plug on all sides of said flow passages, means for rotating said plug to move said port into and out of alignment with said flow passages, at least one groove in the smaller end of said liner located in predetermined angular relation with said apertures, a projection extending inwardly from the wall of said bore adjacent the smaller end thereof for engagement within each said groove upon insertion of said liner in said bore to resist movement of said liner axially of said bore toward the smaller end thereof under the deforming pressure of said pressing means, said projections being located in predetermined angular relation with said flow passages to lock said liner with said apertures aligned with said flow passages throughout the rotational movement of said plug, the radial distance from the inner end of said projection to the axis of said bore being less than the radius of the larger end of said plug to provide for positive engagement of said projection with said plug in response to axial movement of said plug and thereby to limit axial movement of said plug toward the smaller end of said bore, and said liner being of sufficiently greater length than said bore to project outwardly thereof for visual inspection of the angular location of said groove.

3. A lined plug valve comprising a valve body having flow passages therethrough and a tapered bore therein extending transversely of said flow passages, a tapered sleeve liner of deformable material fitted within said bore and having apertures therein for alignment with said flow passages, means for retaining the larger end of said liner against axial movement into said bore, a tapered plug received within said liner and having a port therethrough for connecting said flow passages, means for pressing said plug into said liner to deform said liner into continuous circumferential sealing engagement with said bore and said plug on all sides of said flow passages, means for rotating said plug to move said port into and out of alignment with said flow passages, at least one groove in the smaller end of said liner located in predetermined angular relation with said apertures, a projection extending inwardly from the wall of said bore adjacent the smaller end thereof for engagement within each said groove upon insertion of said liner in said bore to resist movement of said liner axially of said bore toward the smaller end thereof under the pressure of said pressing means and thereby to minimize decrease in the thickness of said liner resulting from elongation thereof under pressure, said projection being located in predetermined angular relation with said flow passages to lock said liner with said apertures aligned with said flow passages throughout the rotational movements of said plug, and the radial distance from the inner end of said projection to the axis of said bore being less than the radius of the larger end of said plug to provide for positive engagement of said projection with said plug in response to axial movement of said plug and thereby to limit axial movement of said plug toward the smaller end of said bore.

4. A lined plug valve comprising a valve body having flow passages therethrough and a tapered bore therein extending transversely of said flow passages, a tapered sleeve liner of deformable material fitted within said bore and having apertures therein for alignment with said flow passages, means for retaining the larger end of said liner against axial movement into said bore, a tapered plug received within said liner and having a port therethrough for connecting said flow passages, means for pressing said plug into said liner to deform said liner into continuous circumferential sealing engagement with said bore and said plug on all sides of said flow passages, means for rotating said plug to move said port into and out of alignment with said flow passages, a pair of grooves in the smaller end of said liner located in predetermined angular relation with said apertures, a pair of projections extending inwardly from the wall of said bore adjacent the smaller end thereof for engagement within said grooves upon insertion of said liner in said bore to resist movement of said liner axially of said bore toward the smaller end thereof under the pressure of said pressing means and thereby to minimize decrease in the thickness of said liner resulting from elongation thereof under pressure, said projections being located in predetermined angular relation with said flow passages to lock said liner with said apertures aligned with said flow passages throughout the rotational movements of said plug, and the radial distance from the inner ends of said projections to the axis of said bore being less than the radius of the larger end of said plug to provide for positive engagement of said projections with said plug in response to axial movement of said plug and thereby to limit axial movement of said plug toward the smaller end of said bore.

5. A lined plug valve comprising a valve body having flow passages therethrough and a tapered bore therein extending transversely of said flow passages, a tapered sleeve liner of deformable material fitted within said bore and having apertures therein for alignment with said flow passages, a circumferential shoulder on the larger end of said liner and of larger diameter than the larger end of said bore to seat on said body exteriorly of said tapered bore, a tapered plug received within said liner and having a port therethrough for connecting said flow passages, means for urging said plug into said liner to deform said liner into continuous circumferential sealing engagement with said bore and said plug on all sides of said flow passages, means for rotating said plug to move said port into and out of alignment with said flow passages, means for clamping said shoulder on said liner against said body to resist axial and angular movement of the larger end of said liner under the pressure and rotational movement of said plug, at least one groove in the smaller end of said liner located in predetermined angular relation with said apertures, a projection extending inwardly from the wall of said bore adjacent the smaller end thereof for engagement within each said groove upon insertion of said liner in said bore, said projection being located in predetermined angular relation with said flow passages to lock said liner with said apertures aligned with said flow passages and to resist movement of said liner axially of said bore toward the smaller end thereof in response to operation of said urging means, and the radial distance from the inner end of said projection to the axis of said bore being less than the radius of the larger end of said plug to provide for positive engagement of said projection with said plug in response to axial movement of said plug and thereby to prevent removal of said plug through the smaller end of said bore.

6. A lined plug valve comprising a valve body having flow passages therethrough and a tapered bore therein extending transversely of said flow passages, a tapered sleeve liner of deformable material fitted within said bore and having apertures therein for alignment with said flow passages, means for retaining the larger end of said liner against axial movement into said bore, a tapered plug received within said liner and having a port therethrough for connecting said flow passages, means for pressing said plug into said liner to deform said liner into continuous circumferential sealing engagement with said bore and said plug on all sides of said flow passages, means for rotating said plug to move said port into and out of alignment with said flow passages, a pair of grooves in the smaller end of said liner located in predetermined angular relation with said apertures, a pair of pins carried by the wall of said bore and projecting inwardly of said bore adjacent the smaller end thereof for engagement within said grooves upon insertion of said liner in said bore to resist movement of said liner axially of said bore toward the smaller end thereof under the pressure of said pressing means and thereby to minimize decrease in the thickness of said liner resulting from elongation thereof under pressure, said pins being located in predetermined angular relation with said flow passages to lock said liner with said apertures aligned with said flow passages throughout the rotational movements of said plug, and the radial distance from the inner ends of said pins to the axis of said bore being less than the radius of the larger end of said plug to provide for positive engagement of said pins with said plug in response to axial movement of said plug and thereby to limit axial movement of said plug toward the smaller end of said bore.

7. A lined plug valve comprising a valve body having flow passages therethrough and a tapered bore therein extending transversely of said flow passages, a tapered sleeve liner of deformable material fitted within said bore and having apertures therein for alignment with said flow passages, a circumferential shoulder on the larger end of said liner and of larger diameter than the larger end of said bore to seat on said body exteriorly of said tapered bore, a tapered plug received within said liner and having a port therethrough for connecting said flow passages, means for urging said plug into said liner to deform said liner into continuous circumferential sealing engagement with said bore and said plug on all sides of said flow passages, means for rotating said plug to move said port into and out of alignment with said flow passages, means for clamping said shoulder on said liner against said body to resist axial and angular movement of the larger end of said liner under the pressure and rotational movement of said plug, a pair of grooves in the smaller end of said liner located in predetermined angular relation with said apertures, the wall of said bore having a pair of transverse bores therethrough adjacent the smaller end thereof, a pair of pins received in said transverse bores and projecting inwardly of said tapered bore for engagement within said grooves upon insertion of said liner in said tapered bore, said transverse bores being located in predetermined angular relation with said flow passages to cause said pins to lock said liner with said apertures aligned with said flow passages and to resist movement of said liner axially of said bore toward the smaller end thereof in response to operation of said urging means, and the radial distance from the inner ends of said pins to the axis of said bore being less than the radius of the larger end of said plug to provide for positive engagement of said pins with said plug in response to axial movement of said plug and thereby to prevent removal of said plug through the smaller end of said bore, said pins being positively secured to said body to prevent radially outward camming thereof by said plug, and said liner being of sufficiently greater length than said bore to project outwardly thereof for visual inspection of the angular location of said groove.

References Cited in the file of this patent

UNITED STATES PATENTS

| | | |
|---|---|---|
| 860,217 | Jackson | July 16, 1907 |
| 2,210,335 | Mueller | Aug. 6, 1940 |
| 2,713,987 | Schenck | July 26, 1955 |

FOREIGN PATENTS

| | | |
|---|---|---|
| 663,048 | Great Britain | 1951 |
| 29,894 | Great Britain | 1912 |